United States Patent [19]

Green et al.

[11] Patent Number: 5,065,763
[45] Date of Patent: Nov. 19, 1991

[54] COMBINED REFLECTION AND TRANSMSSION UNTRASONIC IMAGING METHOD AND APPARATUS

[75] Inventors: Philip S. Green, Redwood City; John S. Ostrem; Todd K. Whitehurst, both of Palo Alto, all of Calif.

[73] Assignee: SRI International, Menlo Park, Calif.

[21] Appl. No.: 483,574

[22] Filed: Feb. 21, 1990

[51] Int. Cl.$^5$ .............................................. A61B 8/00
[52] U.S. Cl. ................................ 128/660.07; 73/620
[58] Field of Search ............... 128/660.01, 660.06, 128/660.07; 73/602, 606, 620, 626

[56] References Cited

U.S. PATENT DOCUMENTS

| | | | |
|---|---|---|---|
| 3,937,066 | 2/1976 | Green et al. | 73/67.5 R |
| 4,509,368 | 4/1985 | Whiting et al. | 128/661.02 X |
| 4,594,895 | 6/1986 | Fujii | 128/660.06 X |
| 4,608,868 | 9/1986 | Green | 73/606 |
| 4,690,150 | 9/1987 | Mayo, Jr. | 128/660.04 |
| 4,691,707 | 9/1987 | Sankar | 128/660.07 |
| 4,719,509 | 1/1988 | Sakamoto | 128/660.07 X |
| 4,761,739 | 8/1988 | Shimura | 364/414 |
| 4,785,818 | 11/1988 | Hardin | 128/660.07 |
| 4,862,892 | 9/1989 | Green | 128/660.07 |

FOREIGN PATENT DOCUMENTS 123427 10/1984 European Pat. Off. .
WO87/00638 1/1987 PCT Int'l Appl. .

OTHER PUBLICATIONS

Pattern Classification and Scene Analysis—R. O. Duda and P. E. Hart, John Wiley & Sons, pp. 114-118—1973.
EP 0097917 published Jan. 1984, "UTS Tomographic System Using Sectoral Scanners".

Primary Examiner—Francis Jaworski
Attorney, Agent, or Firm—Victor R. Beckman

[57] ABSTRACT

An ultrasonic imaging system and method are shown which includes a transducer (10) for pulse insonification of an object (12) and for receiving echo signals from within the object. Echo signals are converted to electrical signals at the transducer (10) and the electrical signals are supplied to a signal processor (28). Processor (28) includes an envelope detector (38) and integrator (40) for integrating the detected output. Echo signals obtained from a first range zone (Z1) at the focal point (F) are processed by processor (28) and supplied to a hold circuit (50) to provide a reflection pixel signal value which is dependent upon reflectivity at the focal point. Echo signals obtained from a second range zone (Z2) opposite the focal point (F) also are processed by processor (28) and supplied to a hold circuit (52) to provide a transmission pixel signal value which is dependent upon attenuation of ultrasonic waves at the focal point (F). The reflection and transmission pixel signal values from hold circuits (50) and (52) are supplied as inputs to generator (60) for generation of combined image data for a combined image which is a function of both reflection and transmission image data. A combined image is displayed at display (64).

63 Claims, 6 Drawing Sheets

COMBINED REFLECTION AND TRANSMSSION UNTRASONIC IMAGING METHOD AND APPARATUS

ORIGIN OF THE INVENTION

This invention was made in part or in whole with United Stated Government Support under a grant with the National Institutes of Health. The U.S. Government has certain rights in this invention.

TECHNICAL FIELD

This invention relates to a combined reflection and transmission ultrasonic imaging method and apparatus which includes means for obtaining registered C-scan reflection image data and transmission image data dependent upon reflectivity and transmissivity, respectively, of the subject at the image plane, and for generating combined image data which is a function of the reflection and transmission image data so as to produce a combined image of superior quality.

BACKGROUND OF THE INVENTION

The suggestion for obtaining a conventional C-scan image by processing those signals reflected from scatterers at the focal point, then processing those signals obtained from a backscatter zone opposite the focal point to obtain first and second registered C-scan pixel signal values dependent upon reflectivity and transmissivity, respectively, at the focal point is contained in U.S. Pat. No. 4,608,868 by P. S. Green. An ultrasonic reflex transmission imaging method and apparatus with artifact removal is shown in U.S. Pat. No. 4,862,892 by P. S. Green. There, following transmission of a focused first ultrasonic energy pulse, energy reflected from a backscatter zone opposite the focal point is processed to obtain a pixel signal value that is dependent upon transmissivity, or attenuation, at the focal point. Then a second, unfocused, ultrasonic energy pulse is transmitted and energy reflected from substantially the same backscatter zone is processed to obtain a compensation signal value that is dependent upon reflectivity of scatterers in the backscatter zone but is substantially independent of transmissivity, or attenuation, at the focal point. The pixel and compensation signal values are combined to provide for a compensated pixel signal value.

SUMMARY AND OBJECTS OF THE INVENTION

An object of this invention is the provision of an ultrasonic imaging method and apparatus for producing an improved orthographic, or C-scan, ultrasonic image using registered reflection and transmission orthographic images.

An object of this invention is the provision of an improved ultrasonic imaging method and apparatus of the above-mentioned type which includes means for combining the reflection and transmission orthographic image data to provide for a combined image of higher quality than either the reflection or transmission image.

Apparatus for obtaining orthographic, or C-scan, images of the reflection type and of the transmission type are well known in the art. Also, as mentioned above, U.S. Pat. No. 4,608,868 discloses means for obtaining registered reflection and transmission type C-scan images. However, when imaging objects such as body parts, using either reflection or transmission type imaging methods, the tissue under investigation may be substantially indistinguishable from other imaged tissue.

In accordance with the present invention, registered reflection image data and transmission image data are obtained, from which data combined image data is generated which is a function of both the reflection and transmission image data to provide for a combined image of superior quality. The combining function may be linearly or nonlinearly dependent upon the desired output. In one arrangement employing a linear combination, the reflection and transmission data are weighted and the weighted values are combined by simply adding the same.

The invention, together with other objects, features and advantages thereof will be more fully understood from a consideration of the following detailed description of certain embodiments thereof taken in connection with the accompanying drawings. It will be understood that the drawings are for purposes of illustration only and that the invention is not limited to the specific embodiments disclosed therein.

DETAILED DESCRIPTION OF THE DRAWINGS

In the drawings, wherein like reference characters refer to the same parts in the several views.

Figure 1:
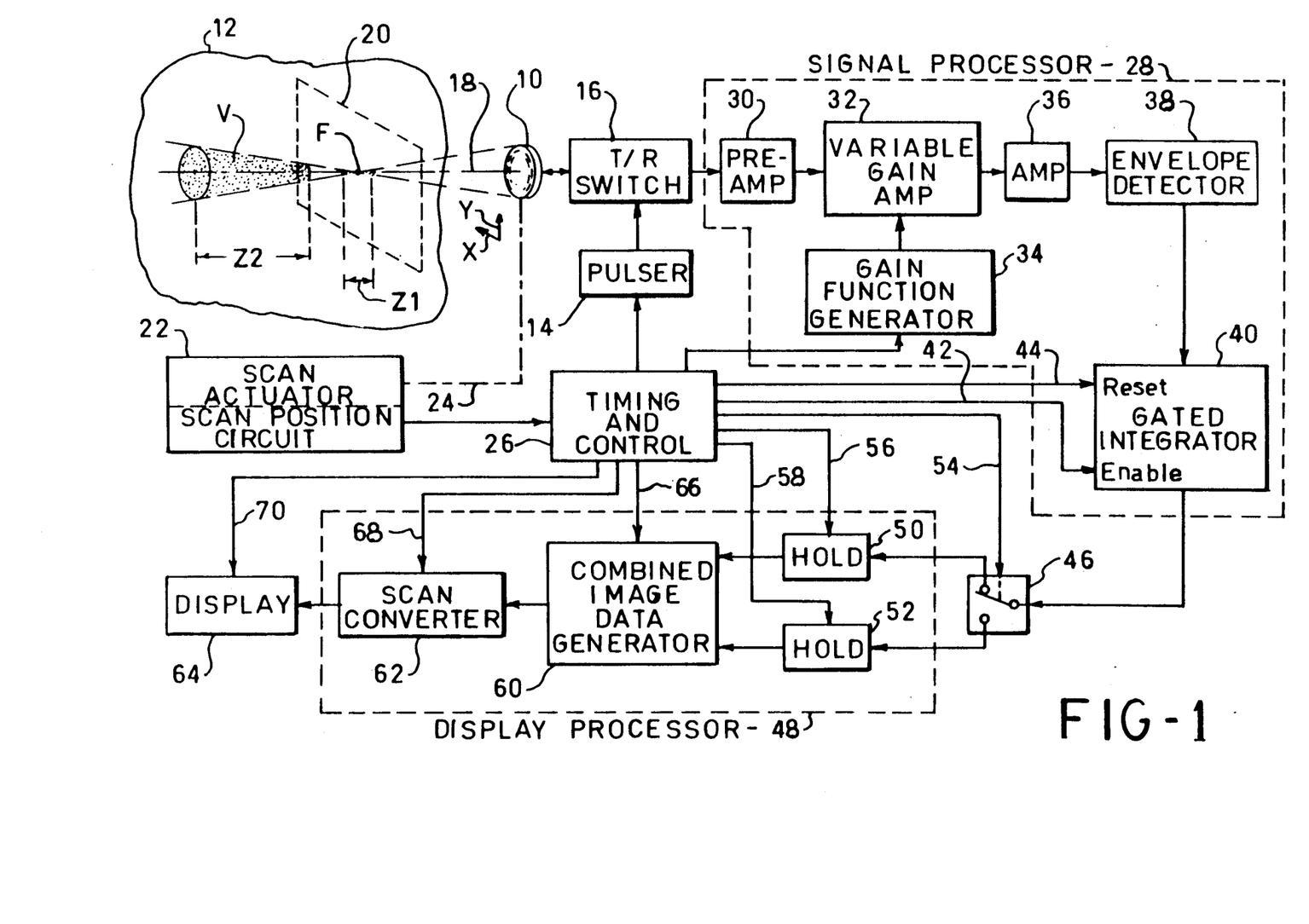
FIG. 1 is a block diagram showing an ultrasonic imaging system of the reflection/reflex transmission type embodying the present invention.

Reference first is made to FIG. 1 wherein there is shown an ultrasonic reflection/reflex transmission imaging system comprising transducer 10 which in the illustrated arrangement is used for both transmitting and receiving ultrasonic pulse signals. For purposes of illustration, a curved focusing transducer is shown. Ultrasonic compressional waves generated by focusing transducer 10 are coupled through a suitable acoustic transmission medium such as water, not shown, to the subject 12 under investigation for pulse insonification thereof. In place of the illustrated focusing transducer, other acoustical focusing means such as acoustic lens, a curved acoustical mirror, or the like, may be employed. Also, electronic focusing may be employed in lieu of, or in addition to, acoustical focusing means. Also, as will become apparent hereinbelow, although focusing during both transmitting and receiving operations is preferred, focusing only during receiving operation or only during transmitting operation is sufficient.

The transmitting portion of the system includes pulser 14 for recurrent generation of high frequency energy pulses which are supplied through transmit-receive switch 16 to transducer 10 for pulse generation of broadband ultrasonic waves which are focused at focal point F within the subject. Typically, a broadband pulse within a frequency range of 1 MHz to 10 MHz may be employed. The ultrasonic beam axis is identified by reference numeral 18 and, in the illustrated embodiment of the invention, registered reflection and reflex transmission C-scan image data of plane 20 normal to axis 18 are obtained by movement of the focal point F in plane 20 to scan the same.

The transducer 10 is scanned in the X and Y directions shown in FIG. 1 by a scan actuator of scanning mechanism 22 connected thereto through mechanical linkage 24. The scanning mechanism 22 includes a scan position information circuit having an output connected to timing and control unit 26 which, in turn, has outputs for synchronizing the transmitting, receiving and display processor operations.

Reflected ultrasonic signals from discontinuities, or scatters, within the subject 12 received by transducer 10 are converted to electrical signals and supplied through transmit-receive switch 16 to a signal receiver, or processor, 28. The electrical signals are amplified by preamplifier 30, and then supplied to a variable gain amplifier 32, the gain of which amplifier is time varied in accordance with the output from a gain function generator 34 under control of timing and control unit 26. As is well understood, time variable gain is used to compensate for greater attenuation of return signals received from further within the subject. From variable gain amplifier 32, received signals are amplified by amplifier 36, and the amplified output is detected by use of envelope detector 38. Detector 38 comprises, for example, a full wave rectifier with low pass filter means and has as an output a signal that is proportional to the envelope of the high frequency signal output from amplifier 36.

The output from envelope detector 38 is supplied to a gated integrator 40 for time integration thereof during two different pulse reception periods. Gated integrator 40 is provided with gate enable and reset signals from timing and control unit over lines 42 and 44, respectively. Integrator 40 first is enabled, i.e. gated on, during a brief time period that echo signal are received from backscatter zone Z1 located at the focal point F. A reflection pixel signal value is produced at the integrator output which is substantially dependent upon reflection of acoustic waves at the focal point. The reflection pixel signal value from integrator 40 is transferred through switch 46 to a display processor 48. In particular, with switch 46 in the illustrated full line switch position, the reflection pixel signal value is supplied to a first hold circuit 50 in processor 48 for temporary storage thereof.

Gated integrator 40 then is reset in preparation for integrating signals from a second backscatter zone Z2. Gated integrator 40 again is enabled, now during the time period that echo signals are received from second backscatter zone Z2 located opposite the focal point F from transducer 10. A transmission pixel signal value now is produced at the integrator output which is substantially dependent upon transmissivity, or attenuation, of acoustic waves at focal point F. The transmission pixel signal value from integrator 40 is transferred through switch 46 to a second hold circuit 52 for momentary storage thereof. Switch 46 and hold circuits 50 and 52 are under control of outputs from timing and control unit 26 connected thereto over lines 54, 56 and 58, respectively. After transfer of the reflection pixel signal value to hold circuit 52, gated integrator 40 again is reset in preparation for the next pulse transmission-receiving cycle of operation.

The reflection and transmission pixel signal values from hold circuits 50 and 52 are supplied to a combined image data generator 60 for generation of combined image data at the output thereof which is a function of both the reflection and transmission image data supplied thereto. The combined image data provides for a combined image which is superior to either a reflection or transmission image separately. The combined image data from generator 60 is transferred to a scan converter 62 and thence to visual display means 64, such as a cathode ray tube. Combined image data generator 60, scan converter 62 and display 64 are under control of outputs from timing and control unit 26 connected thereto over lines 66, 68 and 70, respectively.

The information contained in the reflection and transmission image data can be used in many different ways including automatic computer detection of a target object such as a kidney stone or tumor, removal of image artifacts, computer enhancement to improve the visibility of the target object against that of surrounding tissue, and the like. In general, it is desired to combine the information in the reflection and transmission images in such a way as to maximize their utility for the particular problem of interest. Formally, it is desired to generate $$C(x,y) = F(R(x,y), T(x,y)) \qquad (1)$$

where $R(x,y)$ is the original reflection image, $T(x,y)$ is the original transmission image, F is a function specifying how $R(x,y)$ and $T(x,y)$ are to be combined, and $C(x,y)$ is the result (where C may be an image, a classification result, or the like). The explicit form of the combining function F, which may be linear or nonlinear, depends upon the problem at hand.

Figure 2:
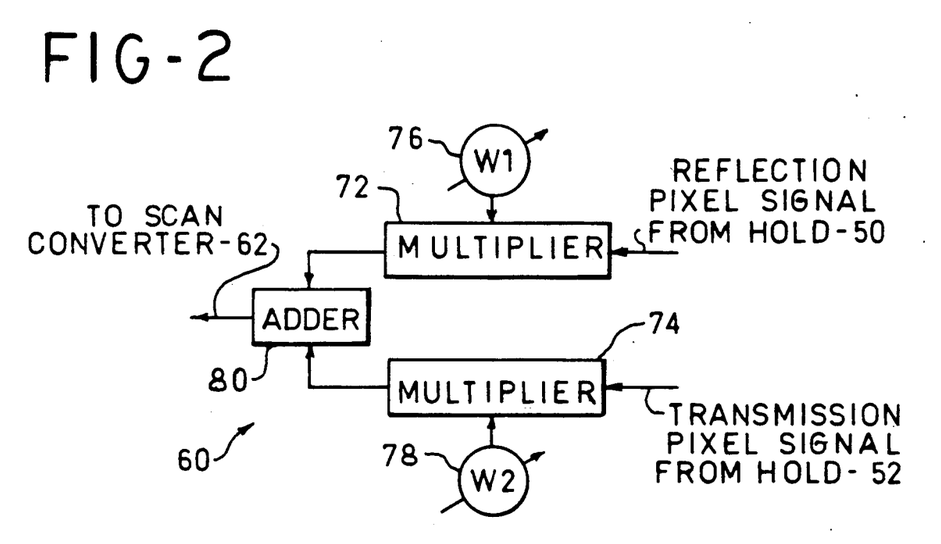
FIG. 2 is a block diagram of a combined image data generator of a type which may be employed in the system shown in FIG. 1.

In FIG. 2, to which reference now is made, a combined image data generator 60 is shown which combines reflection image data and transmission image data linearly. The illustrated generator comprises first and second multipliers 72 and 74, to which the reflection and transmission pixel signal values from hold circuits 50 and 52, respectively, are supplied. Second inputs for multipliers 72 and 74 are provided by variable voltages sources 76 and 78, respectively. The multiplier outputs are combined at adder 80, and the combined pixel signal value is supplied to scan converter 62. The voltage sources 76 and 78 are labeled W1 and W2, respectively, which designates the weights by which the respective reflection and transmission signal values are multiplied. Multiplication by a weight of one, or unity, results in no change in the associated pixel signal value, and multiplication by a weight of zero (0) effectively blocks the pixel signal path through the associated multiplier.

Figure 3A:
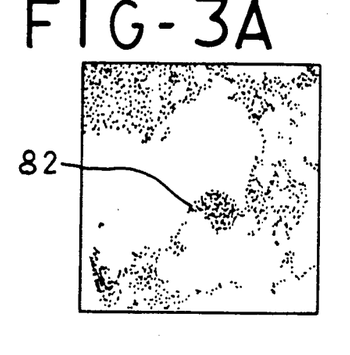
FIGS. 3A and 3B are transmission and reflection images, respectively, of the type which may be obtained using the system shown in FIGS. 1 and 2.
Figure 3B:
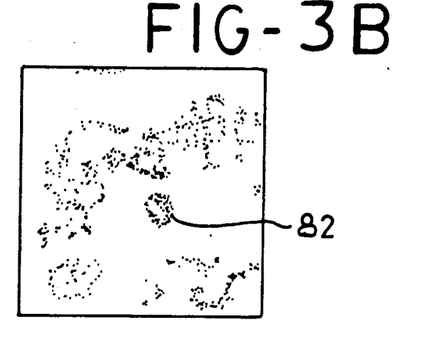

Reference now is made to FIGS. 3A and 3B wherein examples of reflex transmission and reflection C-scan images, respectively, are shown. The reflex transmission image of FIG. 3A may be provided by setting weight W1 of variable voltage source 76 to zero whereby only reflex transmission pixel signal values are displayed at display unit 64. Similarly, by setting weight W2 of variable voltage source 78 to zero, only reflection pixel signal values are displayed to provide for a display of the type shown in FIG. 3B. In FIGS. 3A and 3B image darkness is directly dependent upon transmissivity and reflectivity, respectively, at the focal point.

The reflex transmission and reflection images of FIGS. 3A and 3B are of a type which may be obtained when imaging a target object such as a kidney stone in soft tissue. The kidney stone images are identified by reference numeral 82 in FIGS. 3A and 3B, which images appear in the same relative location in FIGS. 3A and 3B since the images are inherently in perfect spatial registration. The kidney stone is highly attenuating and, in FIG. 3A, appears as a dark region near the center of the image. There are, however, several other dark areas in the image of FIG. 3A resulting from attenuation by surrounding soft tissue which could be mistaken for stone. Similarly, some of the soft tissue reflections in FIG. 3B appear as dark as those from the stone.

Figure 4:
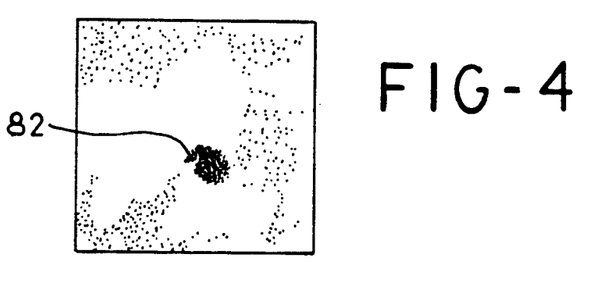
FIG. 4 shows a combined image obtained using input data from the transmission and reflection images of FIGS. 3A and 3B.

FIG. 4, to which reference is made, shows the combined image obtained in the manner of this invention from the transmission and reflection images of FIGS. 3A and 3B. The combined image of FIG. 4 was obtained using weights W1 and W2 of 1.0 and 1.5, respectively. It will be noted that stone image 82 of the combined image stands out clearly and there is no soft tissue area that could be mistaken to be a stone. In this case an improved image which clearly delineates the kidney stone is produced by combining the reflection and transmission images.

Figure 5A:
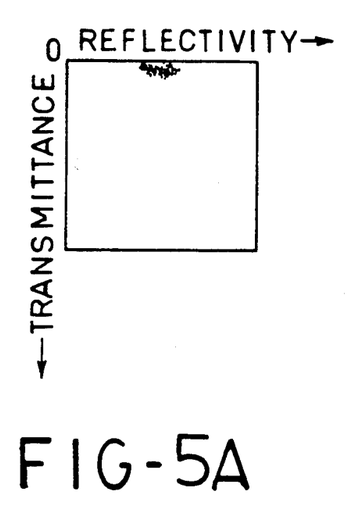
FIGS. 5A and 5B are two-dimensional object and background histograms, respectively, of reflectivity and transmittance derived from pixel signal values of both the transmission and reflection images of FIGS. 3A and 3B.
Figure 5B:
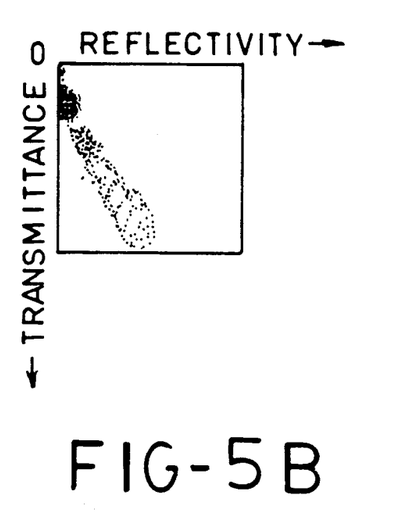

The fact that an improved image may be obtained using both reflection and transmission image data will become apparent after examination of two-dimensional histograms of reflectivity and transmittance derived from the pixel signal values of both images of FIGS. 3A and 3B. FIG. 5A shows the histogram for the image areas containing the kidney stone, and FIG. 5B shows the corresponding histogram derived from the image regions exclusive of the stone, and identified herein as the soft tissue histogram. From FIGS. 5A and 5B it will be apparent that the clusters for the stone and the soft tissue are much better separated in the two-dimensional space of reflectivity and transmittance than they are in either transmittance or reflectivity alone. Owing to the substantial difference in the acoustic properties of soft tissue and stone, they can be substantially separated based on the histogram data. Following is a description of one method of deriving a linear combination of the reflection and transmission images to produce a combined image of superior discriminating power.

Figure 6:
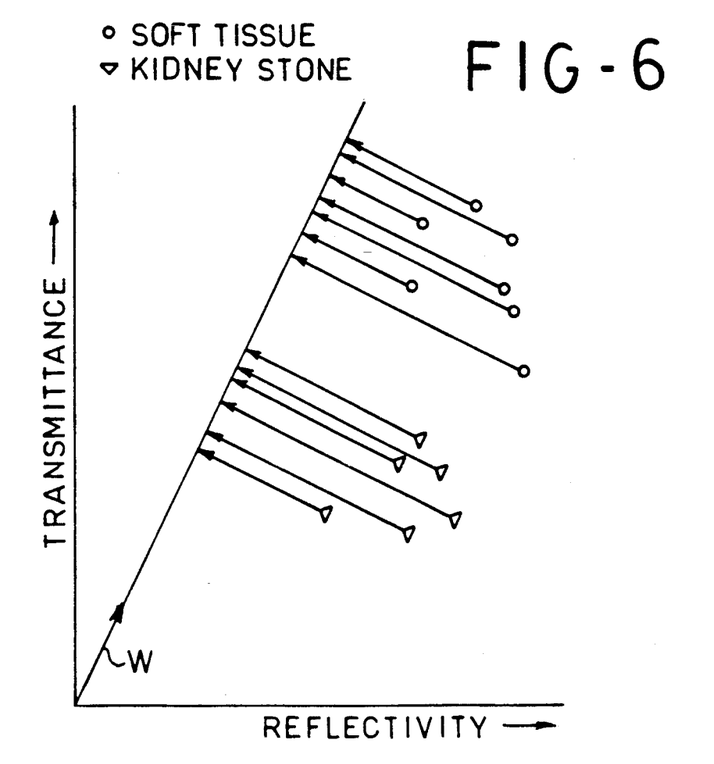
FIG. 6 shows the projection of two dimensional reflectivity and transmittance data along a line in the two-dimensional space for use in describing one method of determining weights to be employed for obtaining a combined image of improved quality.

The goal is to create a new combined image with values $$y_{ij} = F(x_{ij}) = \bar{w}^t x_{ij} = w_1 r_{ij} + w_2 t_{ij} \quad (2)$$

where $y_{ij}$ is the ijth pixel of the combined image, $x_{ij} = (r_{ij}, t_{ij})^t$ represents the reflectivity $r_{ij}$ and transmittance $t_{ij}$ of the ijth pixel of the original reflection and transmission images, respectively, $\bar{w} = (w_1, w_2)^t$ is a weight vector, and the superscript "t" denotes the transpose. The problem is now to derive values for the weights, w1 and w2, that results in the best final image. The operation $y_{ij} = \bar{w}^t x_{ij}$ projects the two dimensional reflectance and transmittance data along a line in the two-dimensional space, as shown in FIG. 6. Thus, choosing a $\bar{w}$ corresponds to choosing the line that results in maximum separation between the stone and the background after orthogonal projection onto the line.

The arithmetic means of the stone data and background data are $$m_k = \Sigma x_{ij}/n_k \quad (3)$$

where the sum is over all stone pixels, and $$m_b = \Sigma x_{ij}/n_b \quad (4)$$

where the sum is over all soft tissue pixels and $n_k$, $n_b$ are the total number of stone pixels and background pixels, respectively, in the reflection and transmission images.

In practice the data used to determine $\bar{w}$ may consist of many pairs of images. However, to keep the notation simple we have left out the additional sum over the number of training samples.

Similarly, the respective scatter matrices are defined as $$S_k = \Sigma (x_{ij} - m_k)(x_{ij} - m_k)^t \quad (5)$$

where the sum is over all stone pixels $$S_b = \Sigma (x_{ij} - m_b)(x_{ij} - m_b)^t \quad (6)$$

where the sum is over all soft tissue pixels.

On the basis that for the combined image (i.e. in the projected space defined by $y_{ij} = \bar{w}^t x_{ij}$) we want to maximize the difference between the means of the stone and soft tissue clusters relative to some measure of their scatters e.g. standard deviations, we define the criterion function $$C(w) = |w^t m_k - w^t m_b| / (w^t S_k w + w^t S_b w) \quad (7)$$

where $\bar{w}^t m_k$ and $\bar{w}^t m_b$ are the means of the stone data and the background data in the projected space, respectively, and $\bar{w}^t S_k \bar{w}$, $\bar{w}^t S_b \bar{w}$ are the corresponding projected scatters.

This is essentially the same criterion function used to derive Fisher's linear discriminant.

Maximization of $C(\bar{w})$ with respect to $\bar{w}$ yields the solution $$w = (S_k + S_b)^{-1}(m_k - m_b) \quad (8)$$

Given a set of training samples consisting of pairs of reflection and transmission images this calculation for $\bar{w}$ is straightforward.

Figure 7:
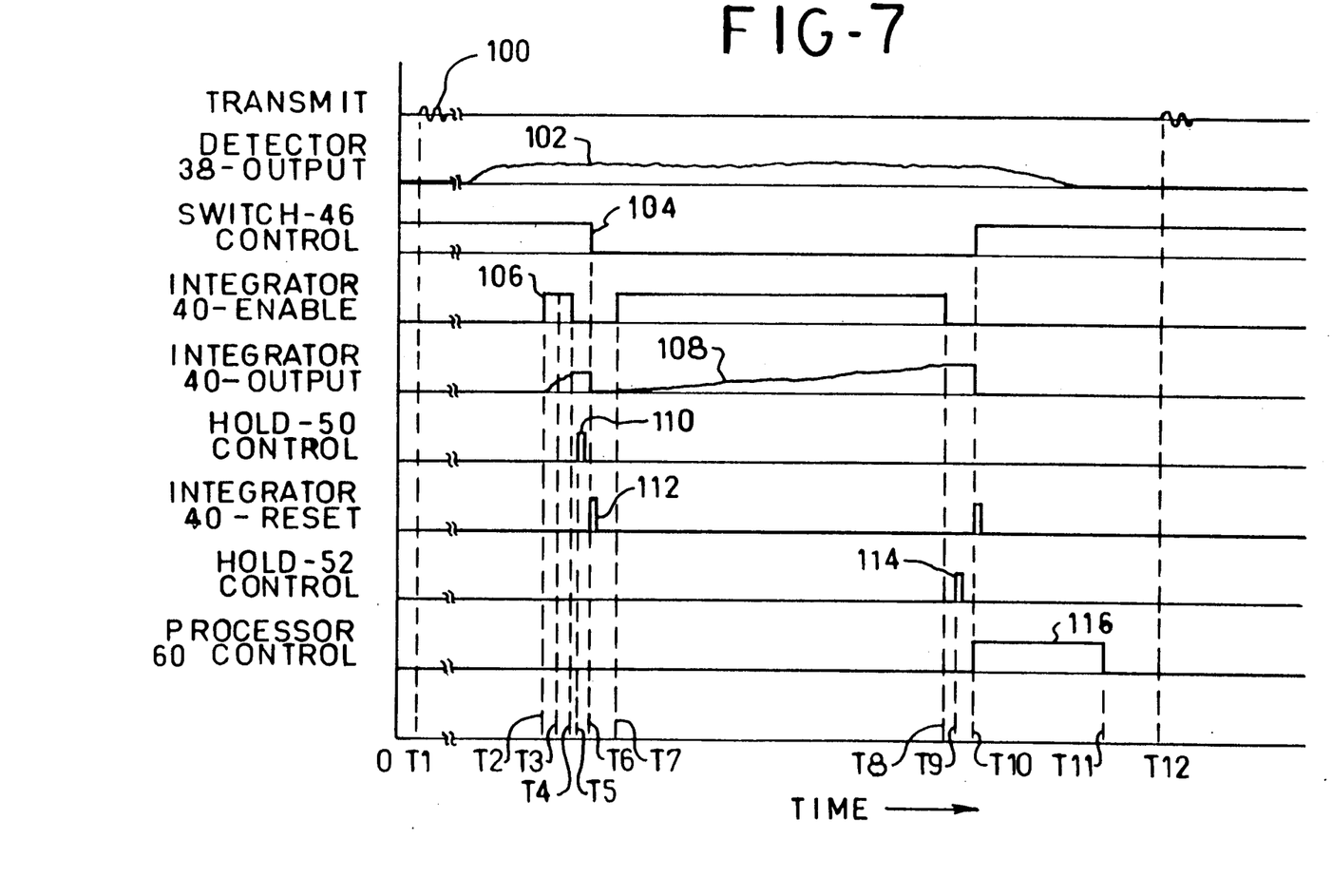
FIG. 7 is a timing diagram for use in explaining operation of the system shown in FIGS. 1 and 2.

Although operation of the system of FIG. 1 is believed to be apparent from the above description, a brief description thereof with reference to the timing diagram of FIG. 7 now will be made. The focusing transducer 10 is moved across subject 12 in the X and Y directions by scanning mechanism 22. A scan position signal is produced by the scan position circuit associated with the scanning mechanism and supplied to the timing and control unit 26 from which control signals for timing transmitter-receiver operations are obtained.

During the transmit pulse period, initiated at time T1, ultrasonic waves are generated by transducer 10 which is energized by the output from pulser 14. In FIG. 7, transmitter pulses are shown at 100. The ultrasonic wave pulse from focusing transducer 10 travels into subject 12, and echo signals are received by the transducer as indicated by output 102 from detector 38. Prior to detection, the return signal output from transducer 10 is amplified by preamplifier 30, variable gain amplifier 32, and amplifier 36 in a conventional manner.

The detector output 102 is supplied to integrator 40 which is enabled between times T2 and T4 by integrator enable control signal 106 supplied thereto over line 42. In FIG. 7, the output from integrator 40 is identified by reference numeral 108. Integration of the detector output 102 between times T2 and T4 is effected while echo signals are being received from range zone Z1 within a small volume substantially centered at the focal point F. At time T3, echo signals reflected from focal point F are received and processed. Between times T2 and T4, the detector output 102 is substantially dependent upon reflectivity in the small focal zone Z1 centered at focal point F.

At the end of the short integration period, at time T4, the integrator output 108 is substantially dependent upon, and provides a measure of, reflectivity at focal point F. At time T5 the output from gated integrator 40 is transferred through switch 46 to hold circuit 50 under control of control signal 110. Hold circuit 50 now contains a pixel signal value that is substantially dependent upon reflectivity at the focal point, F. At time T6, switch 46 is switched by control signal 104 to the illustrated broken line position, and integrator reset signal 112 resets the integrator in preparation for processing echo signals from backscatter zone Z2.

Between times T7 and T8, gated integrator 40 is again enabled by control signal 106 for integration of the detector output 102 while echo signals are being received from backscatter zone Z2. After the second integration period, at time T9, the output from gated integrator 40 is transferred through switch 46, now in the illustrated broken line position, to hold circuit 52 under control of control signal 114. Where focusing during both transmission and reception is employed, as in the illustrated arrangement, received acoustic waves from backscatters within backscatter zone Z2 pass through the focus, F, twice, and the amplitude is substantially dependent upon transmissivity, or attenuation, at the focal point. Obviously, the echo signal from backscatterers within backscatter zone Z2 also is dependent upon reflectivity within the backscatter zone. However, changes in amplitude of the return signal generally are much more dependent upon transmissivity at the focal point than reflectivity within backscatter zone Z2. Furthermore, changes in reflectivity in the backscatter zone may be compensated for using techniques disclosed in U.S. Pat. No. 4,862,892. In any event, the pixel signal value contained in hold circuit 52 is substantially dependent upon, and provides a measure of, transmissivity at the focal pint, F.

At time T10, switch 46 is switched back to the illustrated full line position under control of control signal 104, integrator 40 is reset under control of control signal 112, and combined image data generator 60 is enabled by control signal 116 for weighting and combining the reflection and transmission pixel signal values from hold circuits 50 and 52 in a manner described above with reference to FIG. 2. As noted above, the combined pixel signal value from unit 60 is supplied to display means 64 through scan converter 62 for visual display thereof. At time T11, combined image data generator 60 is disabled, and at time T12, the transducer is again energized for pulse insonification of the subject (waveform 100) to begin another pulse transmitting/receiving operation. Before transmission of the pulse at time T12, the transducer is moved so as to obtain registered reflection and transmission pixel signal values from a different focal point, F, in plane 20 within the object. The scanning and transmitting/receiving operations are repeated for repeatedly obtaining complete fields of pixel signal values for C-scan imaging in plane 20.

Figure 8:
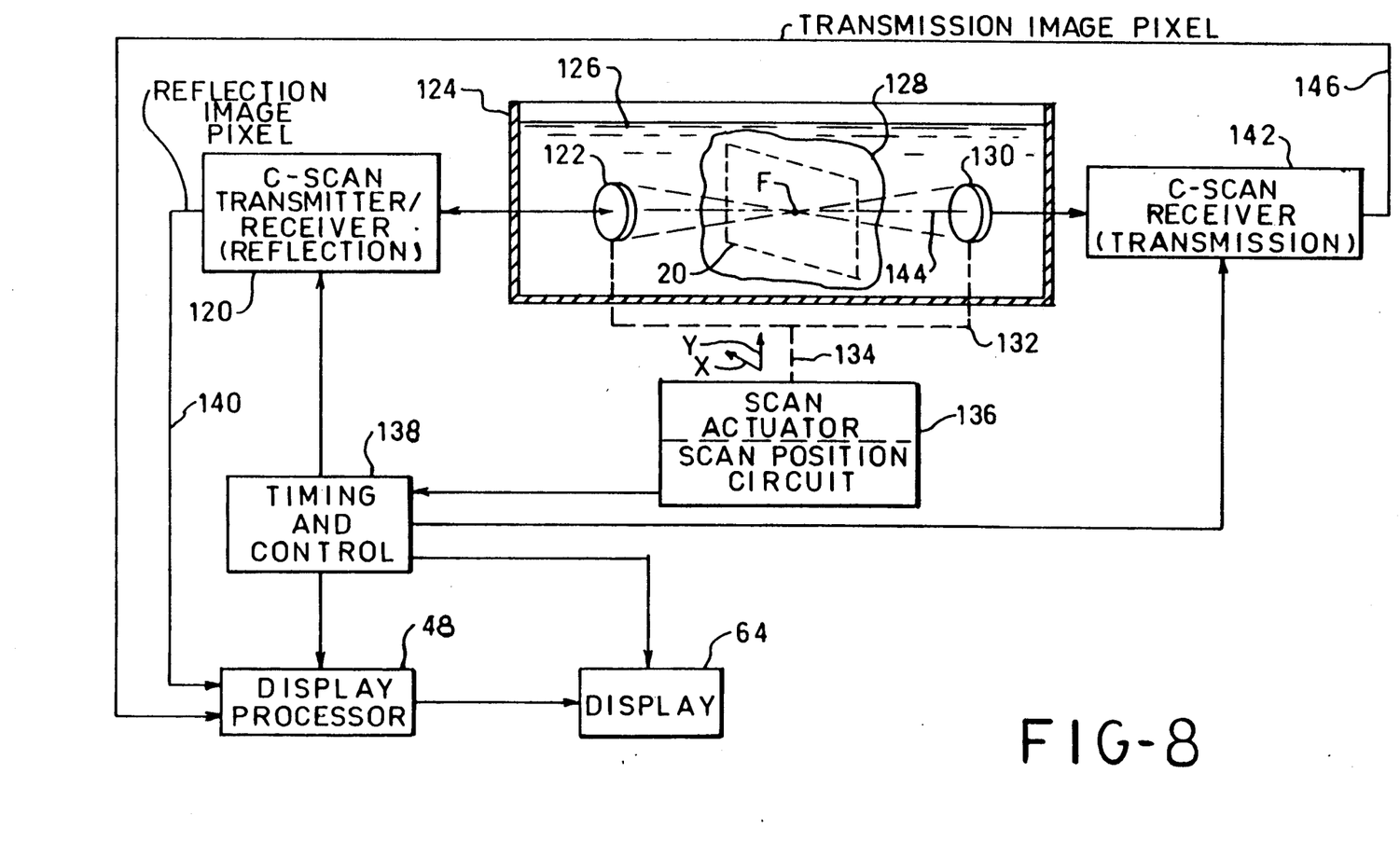
FIG. 8 is a block diagram of a modified form of ultrasonic imaging system of the reflection/transmission type which also embodies the present invention.

A modified form of this invention is shown in FIG. 8, to which figure reference now is made. There, a conventional C-scan transmitter/receiver 120 and associated first focusing transducer 122 are shown, which transducer is located in a container 124 containing a suitable acoustic transmission medium 126, such as water, for support of acoustic waves produced by transducer 122. An object, or subject, 128 under investigation is located in the liquid 126 at the focal point, F, of transducer 122. A second focusing transducer 130 is located in the container 124 at the opposite side of object 128 from transducer 122, which transducer also is focused at focal point F. The transducers 122 and 130 are mechanically interconnected by mechanical link 132 for maintaining the same in fixed relative position so that both transducers remain focused at a common focal point. Link 132 is connected through mechanical linkage 134 to a scan actuator of scanning mechanism 136 for scanning the transducers in the X and Y directions. Scanning mechanism 134 also includes a scan position circuit having an output connected to timing and control unit 138. Outputs from timing and control unit 138 are provided to transmitter/receiver 120, and to display processor 48 and display unit 64 which may be of the same type employed in the FIG. 1 arrangement and described above.

Transmitter/receiver 120 may include a pulser for broadband pulse energization of transducer 122, and a signal processor of the same type as processor 28 shown in FIG. 1 for integrating detected echo signals received from a small range zone at focal point F. Alternatively, the signal processor simply may include a sample and hold circuit which is enabled when return signals are received from focal point F. In any event, following each pulse transmitting receiving operation, the receiver output at line 140 comprises a pixel signal value that is substantially dependent upon reflectivity of subject 128 at focal point F. This reflection pixel signal value is supplied as one input to display processor 48.

A second input for display processor 48 is obtained from receiver 142 that is responsive to the output from transducer 130 which, as noted above, also is focused at focal point F. In FIG. 8, transducers 122 and 130 are shown located along a common beam axis 144. The amplitude of the ultrasonic pulse energy received by transducer 130 is substantially dependent upon acoustic transmittance at focal point F. That is, the amplitude of the received ultrasonic signal at transducer 130 is substantially dependent upon attenuation of acoustic waves at focal point F since substantially all of the received waves are transmitted through the focal point. Consequently, for each pulse receiving operation, the output at output line 146 of receiver 142 provides a measure of transmissivity, or attenuation, at focal point F. The resultant transmission pixel signal value is supplied as a second input to display processor 48.

As described above with reference to FIGS. 1 and 2, the reflection and transmission pixel signal values are weighted and combined at display processor 48 to provide for a combined pixel signal value. Scanning and pulse insonification and receiving operations are repeated to provide for an improved ultrasonic image of plane 20 within subject 128 at display unit 64.

Figure 9:
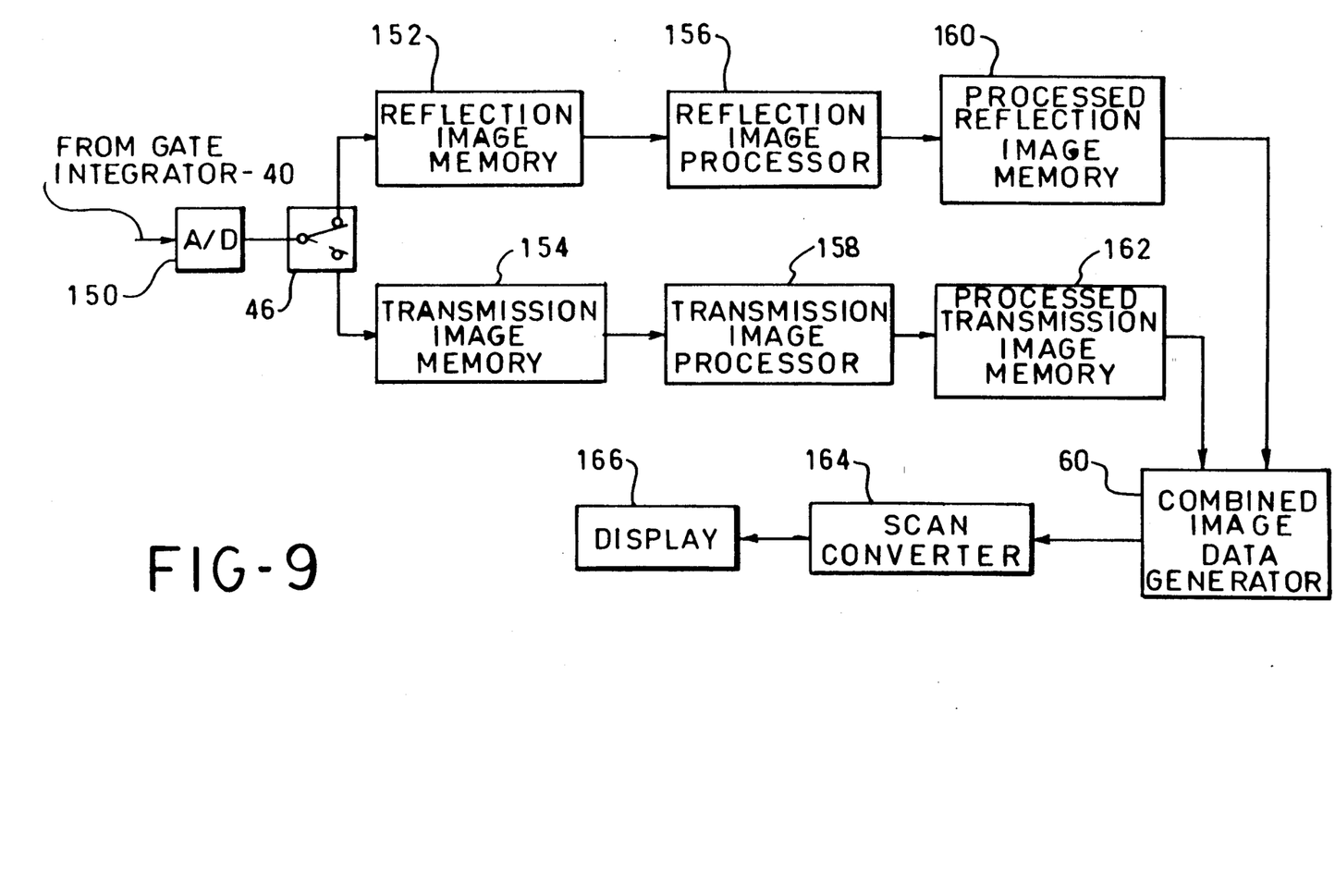
FIG. 9 is a block diagram showing a modified form of display processor which includes means for processing the reflection and transmission image data before combining the same.

It will be understood that the reflection and transmission image data to be combined may comprise reflection and/or transmission image data that has been filtered, smoothed, or otherwise conditioned or pre-processed. For example, reflection and transmission image data may be spatially filtered prior being combined. A modified form of display processor which may be employed for pre-processing reflection and transmission image data is shown in FIG. 9, to which figure reference now is made. In FIG. 9, the output from gated integrator 40 is converted to digital form by analog to digital converter 150. The reflection pixel signal values are supplied to reflection image memory 152 with switch 46 in the illustrated full line position, and transmission pixel signal values are supplied to transmission image memory 154 with switch 46 in the broken line position.

Outputs from the reflection and transmission image memories 152 and 154 are supplied to image processors 156 and 158, respectively, for pre-processing of the reflection and transmission images in any desired manner as, for example, by spatial filtering thereof. The pre-processed images from processors 156 and 158 are stored in memories 160 and 162, respectively. From image memories 160 and 162, the pre-processed reflection and transmission images are supplied to combined image data generator 60 for generation of combined image data for a combined image which is a function of both the reflection and transmission image data. The combined image data is supplied to display 166 through scan converter 164 for visual display thereof.

Pre-processing of the reflection image data or the transmission image data, or both the reflection and transmission image data is contemplated. Also, in addition to smoothing, spatial filtering, spectrum modification as by Fourier transformation, or the like, pre-processing may include compensation for differences in reflectivity in the backscatter zone Z2 in the manner described in U.S. Pat. No. 4,862,892.

The invention having been described in detail in accordance with requirements of the Patent Statutes, various other changes and modifications will suggest themselves to those skilled in this art. For example, if in the FIG. 8 arrangement, reflection and transmission pixel signal values are simultaneously produced at the associated receiver outputs, there would be no need for hold circuits 50 and 52 in the display processor, and such signals could be directly supplied to combined image data generator 60.

Where one pixel signal value is obtained prior to the second registered pixel signal value, such as in the FIG. 1 embodiment wherein the reflection pixel signal value is obtained before the transmission pixel signal value, only the first obtained pixel signal value need be momentarily stored until the second pixel signal value is obtained. The second-obtained pixel signal value need not be momentarily stored, but, instead, may be directly supplied to combined image data generator 60 without first momentarily storing the same.

As noted above, one of the pixel signal values may be provided with a constant weight of one (1.0) in which case there is no need to pass the signal through a multiplier. If, for example, the reflection pixel signal value is to be provided with a weight of 1.0, then voltage source 76 and associated multiplier 72 may be eliminated from the combined image data generator 60 shown in FIG. 2. However, where weights are intended to be varied, it is desirable to simultaneously vary both weights to avoid large intensity changes in the combined image data. For example, if weight W1 is changed between 0 and 1, then W2 may be changed simultaneously by $W2 = 1 - W1$.

Also, it will be apparent that weighting of pixel signal values simply may be provided by use of amplifier means in place of a multiplier and associated voltage gain amplifier means may be used. Obviously, weighting of one or both pixel signal values may be effected at any desired location in the receiver prior to combining of the reflection and transmission pixel signal values.

Obviously, electronic focusing and/or electronic scanning may be employed in place of the illustrated fixed focus transducers and mechanical scanning means. Also, other types of scanning and scanning patterns may be employed including, for example, sector scanning.

It will be apparent that the image produced need not be that of a plane. Instead, a curved or irregular surface may be imaged. However, in all modifications of the invention, substantially registered reflection and transmission pixel signal values are obtained for combining the same.

Obviously, either digital or analog signal processing methods rather than analog ones may be employed in the practice of this invention. Further, it will be apparent that receiver operations are well adapted for performance by software in a suitable programmed computer, or computers. Also, separate transmitting and receiving transducers which are closely located may be employed in place of transducers 10 and 122 in the arrangements of FIGS. 1 and 8, respectively.

Also, gating of the receiver, or signal processor, at points other than at the gated integrator is contemplated. For example, gated amplifier means may be employed. Furthermore, it will be apparent that a chirped, or otherwise coded signal source, may be employed to generate a chirped or otherwise coded ultrasonic wave, together with a receiver for processing the chirped or coded echo signals such that return signals from zones Z1 and Z2 are identifiable for generation of separate reflection and transmission pixel signal values. Continuous rather than pulse operation may be employed using a continusously variable transmitter frequency, or otherwise coded source, and associated receiver.

In addition to facilitating the distinction between hard and soft tissue, it will be apparent that the invention may be used to enhance differences between different soft tissues in the combined image. For example, blood vessels may be made more visible against surrounding soft tissue in the combined image than in either the transmission or reflective images. Or, the distinction between normal and tumor tissue may be enhanced. In the determination of weights to be employed in the illustrated arrangement, only selected portions of the images, which include, say, only the two types of tissue to be distinguished, may be used. For example, instead of using pixel value information from the target object and from the remainder of the image as described above, only pixel value information from the two areas to be distinguished may be employed. In the case of a tumor, pixel signal values for the tumor, and pixel signal values for adjacent, or surrounding tissue, but not from the entire remainder of the image, may be employed in the determination of the weights to be used. However, by employing variable weights under operator control, as in the illustrated arrangement, the operator may improve the visibility of different tissue by varying the weights while observing the combined image at the visual display.

Also, it will be apparent that the invention is not limited to the single pixel by single pixel combination of reflection and transmission image data. Instead, a plurality of pixels from both the reflection and transmission images can be combined to form a single pixel of the combined image.

Since both reflection and transmision type pixel signal values are obtained using the present invention, it will be apparent that they too may be displayed in addition to the combined signal. It is intended that the above and other such changes and modifications shall fall within the spirit and scope of the invention defined in the appended claims.

We claim:

1. In an ultrasonic imaging method for non-invasive imaging a section within a subject, steps comprising
    transmitting by ultrasonic transducer means an ultrasonic energy pulse into the subject to pulse insonify the same,
    receiving by ultrasonic transducer means ultrasonic energy from within the subject,
    focusing the ultrasonic transducer means at a focal point within the subject during at least one of the transmitting and receiving steps,
    for each pulse insonification of the subject, said receiving step including first receiving energy reflected from the focal point and converting the same to first electrical signals substantially dependent upon reflectivity of ultrasonic energy at the focal point, then receiving energy reflected from a backscatter zone that is opposite the focal point from the transducer means and converting the same to second electrical signals substantially dependent upon attenuation of ultrasonic energy at the focal point,
    processing said first and second electrical signals to produce first and second registered pixel signal values that are substantially dependent upon reflectivity and transmissivity, respectively, of the subject at the focal point,
    repeating said transmitting, receiving, focusing and processing steps while scanning the section to obtain separate reflection C-scan image data for a reflection image and transmission C-scan image data for a transmission image of the section, and
    employing both the reflection and transmission image data, generating combined image data for a combined C-scan image which is a function of both the reflection and transmission image data.

2. In an ultrasonic imaging method as defined in claim 1 including displaying the combined image data for visual C-scan display of a combined reflection and transmission image.

3. In an ultrasonic imaging method as defined in claim 1 wherein the step of generating combined image data comprises combining the reflection and transmission image data by a nonlinear function.

4. In an ultrasonic imaging method as defined in claim 1 wherein the step of generating combined image data comprises combining the reflection and transmission image data by a linear function.

5. In an ultrasonic imaging method as defined in claim 1 which includes modifying at least one of the reflection image data and transmission image data before generating combined image data therefrom.

6. In an ultrasonic imaging method as defined in claim 5 wherein the modifying step includes spatial filtering of at least one of the reflection image data and transmission image data.

7. In an ultrasonic imaging method as defined in claim 1 wherein the step of generating combined image data comprises
    weighting the first and second pixel signal values, and
    combining the weighted first and second pixel signal values.

8. In an ultrasonic imaging method as defined in claim 7 including
    determining values of weights employed in said weighting step using reflection and transmission image data from a plurality of subjects.

9. In an ultrasonic imaging method as defined in claim 8 wherein the step of determining values of weights includes separating pixel signal values from first and second areas of the reflection and transmission images of said subjects, and
    maximizing the difference between the means of the pixel signal values from the first and second areas relative to a measure of their scatters.

10. In an ultrasonic imaging method as defined in claim 7 wherein said weighting step includes providing one of the first and second pixel signal values with a unit weight.

11. In an ultrasonic imaging method as defined in claim 7 including varying the weight provided at least one of the first and second pixel signal values to change the combined image data.

12. In an ultrasonic imaging method as defined in claim 7 wherein the combining step comprises adding the first and second pixel signal values.

13. In an ultrasonic imaging method as defined in claim 1 wherein the focusing step comprises focusing the ultrasonic transducer means during the transmitting step for transmitting a focused beam of ultrasonic energy into the subject which beam is focused at the focal point.

14. In an ultrasonic imaging method as defined in claim 1 wherein the focusing step comprises focusing the ultrasonic transducer means at the focal point during the receiving step.

15. In an ultrasonic imaging method as defined in claim 1 wherein the focusing step comprises focusing the ultrasonic transducer means during both the transmitting and receiving steps.

16. In an ultrasonic imaging method for non-invasive imaging a section within a subject, steps comprising
    transmitting by ultrasonic transducer means an ultrasonic energy pulse into the subject to insonify the same,
    receiving by ultrasonic transducer means ultrasonic energy from within the subject,
    focusing the ultrasonic transducer means at a focal point in a focal zone within the subject during at least one of the transmitting and receiving steps,
    for each pulse insonification of the subject, said receiving step including first receiving energy reflected from the focal zone and converting the same to first electrical signals that are substantially dependent upon reflectivity of ultrasonic energy within the focal zone, then receiving energy reflected from a backscatter zone that is opposite the focal point from the transducer means and converting the same to second electrical signals that are substantially dependent upon attenuation of ultrasonic energy within the focal zone, processing said first and second electrical signals to produce first and second registered pixel signal values that are substantially dependent upon reflectivity and transmissivity, respectively, of the subject at the focal point, and combining the first and second pixel signal values to provide for a combined C-scan pixel signal value for use in a C-scan image display.

17. In an ultrasonic imaging method as defined in claim 16 which includes focusing the ultrasonic transducer means at the focal point during the transmitting step for transmitting a focused beam of ultrasonic energy into the subject which is focused at the focal point.

18. In an ultrasonic imaging method as defined in claim 16 which includes focusing the ultrasonic transducer means at the focal point during the receiving step.

19. In an ultrasonic imaging method as defined in claim 16 which includes focusing the transducer means at the focal point during both the transmitting and receiving steps.

20. In an ultrasonic imaging method for non-invasive examination of a section of the interior of a subject from reflections of ultrasonic energy, steps including a) transmitting an ultrasonic energy pulse into the subject along a beam axis, b) receiving by ultrasonic transducer means focused at a focal point in a focal zone within the subject reflected ultrasonic energy and converting the same to electrical signals, c) detecting electrical signals from the focused transducer means, d) for each pulse transmission, obtaining a measure of the value of the detected signals during which ultrasonic energy is reflected from the focal zone for generating a first C-scan pixel signal value dependent upon reflectivity of the subject at the focal point, e) for each pulse transmission, integrating detected signals over a time period during which reflected ultrasonic energy is received from a backscatter volume within a backscatter zone opposite the focal point from the transducer means for generating a second C-scan pixel signal value that is dependent upon transmissivity of acoustic energy at the focal point, f) repeating steps a) through e) while scanning the section to obtain separate reflection and transmission data for reflection and transmission images, respectively, g) using the reflection and transmission image data, generating combined image data for a combined C-scan image which is a function of both the reflection and transmission image data.

21. In an ultrasonic imaging method as defined in claim 20 wherein the step of generating combined image data comprises weighting the first and second pixel signal values, and combining the weighted first and second pixel signal value.

22. In an ultrasonic imaging method as defined in claim 20 which includes filtering at least one of the reflection and transmission image data before generating combined image data.

23. In an ultrasonic imaging method as defined in claim 20 including providing a C-scan display of the combined image data.

24. In an ultrasonic imaging system for imaging a section within a subject, which system includes first and second spaced ultrasonic transducer means, transmitter means for pulse energizing said first transducer means for transmitting an ultrasonic energy pulse into the subject along a beam for pulse insonification of the subject at the section to be imaged, means for scanning the beam, means for focusing the first ultrasonic transducer means at a focal point at the section to be imaged, receiver means for processing signals produced by said first transducer means in response to energy reflected from the focal point to produce reflection image data substantially dependent upon reflectivity of the subject at the focal point, and for processing signals produced by said second transducer means in response to ultrasonic energy transmitted through said focal point to produce transmission image data substantially dependent upon attenuation of the subject at the focal point, said receiver means producing both reflection image data and transmission image data for each transmission of an ultrasonic energy pulse into the subject, and means responsive to said reflection and transmission image data for generating combined image data which is a function of both said reflection and transmission image data for use in a C-scan image display.

25. In an ultrasonic imaging system as defined in claim 24 including means for mechanically interconnecting said first and second transducer means, and said means for scanning the beam comprises means for simultaneously mechanically scanning said first and second transducer means.

26. In an ultrasonic imaging system as defined in claim 25 wherein said first and second transducers comprise focusing transducer means which are focused at said focal point.

27. In an ultrasonic imaging system as defined in claim 24 wherein said means for generating combined image data comprises adder means for adding said reflection and transmission image data.

28. In an ultrasonic imaging system as defined in claim 27 wherein said means for generating combined image data includes means for weighting said reflection and transmission image data before adding the same at said adder means.

29. In an ultrasonic imaging system as defined in claim 28 including means for controlling said weighting means for controlling the weighting of at least one of said reflection and transmission image data.

30. In an ultrasonic imaging system as defined in claim 24 including means for filtering at least one of the reflection and transmission data before supplying said data to said means for generating combined image data.

31. In an ultrasonic imaging system as defined in claim 24 including visual display means responsive to combined image data for visual C-scan display of a combined image.

32. In an ultrasonic imaging system as defined in claim 24 wherein the first ultrasonic transducer means is focused at the focal point during pulse insonification of the subject.

33. In an ultrasonic imaging system as defined in claim 32 wherein the second ultrasonic transducer means is focused at the focal point during reception of ultrasonic energy from within the subject.

34. In an ultrasonic imaging system as defined in claim 24 wherein the first ultrasonic transducer means is focused at the focal point during both pulse insonification of the subject and reception of ultrasonic energy from within the subject.

35. In an ultrasonic imaging method for non-invasive imaging a section within a subject, steps comprising
transmitting by ultrasonic transducer means an ultrasonic energy pulse into the subject to pulse insonify the same,
receiving by ultrasonic transducer means ultrasonic energy from within the subject,
focusing the ultrasonic transducer means at a focal point within the subject during at least one of the transmitting and receiving steps,
for each pulse insonification of the subject said receiving step including receiving by a first transducer energy reflected from the focal point and converting the same to first electrical signals, and receiving by a second transducer located opposite the focal point from the first transducer ultrasonic energy transmitted through the focal point and converting the same to second electrical signals,
processing said first and second electrical signals to produce first and second registered pixel signal values that are substantially dependent upon reflectivity and transmissivity, respectively, of the subject at the focal point,
repeating said transmitting, receiving, focusing and processing steps while scanning the section to obtain separate reflection C-scan image data for a reflection image and transmission C-scan image data for a transmission image of the section, and
employing both the reflection and transmission image data, generating combined image data for a combined C-scan image which is a function of both the reflection and transmission image data.

36. In an ultrasonic imaging method as defined in claim 35 including displaying the combined image data for visual C-scan display of a combined reflection and transmission image.

37. In an ultrasonic imaging method as defined in claim 35 wherein the step of generating combined image data comprises combining the reflection and transmission image data by a nonlinear function.

38. In an ultrasonic imaging method as defined in claim 35 wherein the step of generating combined image data comprises combining the reflection and transmission image data by a linear function.

39. In an ultrasonic imaging method as defined in claim 35 which includes modifying at least one of the reflection image data and transmission image data before generating combined image data therefrom.

40. In an ultrasonic imaging method as defined in claim 39 wherein the modifying step includes spatial filtering of at least one of the reflection image data and transmission image data.

41. In an ultrasonic imaging method as defined in claim 35 wherein the step of generating combined image data comprises
weighting the first and second pixel signal values, and
combining the weighted first and second pixel signal values.

42. In an ultrasonic imaging method as defined in claim 41 including
determining values of weights employed in said weighting step using reflection and transmission image data from a plurality of subjects.

43. In an ultrasonic imaging method as defined in claim 42 wherein the step of determining values of weights includes separating pixel signal values from first and second areas of the reflection and transmission images of said subjects, and
maximizing the difference between the means of the pixel signal values from the first and second areas relative to a measure of their scatters.

44. In an ultrasonic imaging method as defined in claim 41 wherein said weighting step includes providing one of the first and second pixel signal values with a unit weight.

45. In an ultrasonic imaging method as defined in claim 41 including varying the weight provided at least one of the first and second pixel signal values to change the combined image data.

46. In an ultrasonic imaging method as defined in claim 41 wherein the combining step comprises adding the first and second pixel signal values.

47. In an ultrasonic imaging method as defined in claim 35 wherein the focusing step comprises focusing the first ultrasonic transducer during the transmitting step for transmitting a focused beam of ultrasonic energy into the subject which beam is focused at the focal point.

48. In an ultrasonic imaging method as defined in claim 47 wherein the focusing step comprises focusing the first ultrasonic transducer at the focal point when receiving energy reflected from the focal point.

49. In an ultrasonic imaging method as defined in claim 35 wherein the focusing step comprises focusing the second ultrasonic transducer at the focal point when receiving energy transmitted through the focal point.

50. In an ultrasonic imaging method for non-invasive imaging a section within a subject, steps comprising
transmitting by ultrasonic transducer means an ultrasonic energy pulse into the subject to pulse insonify the same,
receiving by ultrasonic transducer means ultrasonic energy from within the subject,
focusing the ultrasonic transducer means at a focal point in a focal zone within the subject during at least one of the transmitting and receiving steps,
for each pulse insonification of the subject, said receiving step including receiving by a first transducer energy reflected from the focal zone and converting the same to first electrical signals substantially dependent upon reflectivity of ultrasonic energy in the focal zone, receiving by a second transducer located opposite the focal point from the first transducer ultrasonic energy transmitted through the focal point and converting the same to second electrical signals substantially dependent upon attenuation of ultrasonic energy in the focal zone,
processing said first and second electrical signals to produce first and second registered pixel signal values that are substantially dependent upon reflectivity and transmissivity, respectively, of the subject at the focal point, and combining the first and second pixel signal values to provide for a combined C-scan pixel signal value for use in a C-scan image display.

51. In an ultrasonic imaging method as defined in claim 50 which includes focusing the first ultrasonic transducer at the focal point during the transmitting step for transmitting a focused beam of ultrasonic energy into the subject which is focused at the focal point.

52. In an ultrasonic imaging method as defined in claim 51 which includes focusing the first transducer at the focal point when receiving energy reflected from the focal zone.

53. In an ultrasonic imaging method as defined in claim 50 which includes focusing the second transducer means at the focal point when receiving energy transmitted through the focal zone.

54. In an ultrasonic imaging system for imaging a section within a subject, which system includes
ultrasonic transducer means,
transmitter means for pulse energizing said transducer means for transmitting an ultrasonic energy pulse into the subject along a beam for pulse insonification of the subject at the section to be imaged,
means for scanning the beam,
means for focusing the ultrasonic transducer means at a focal point at the section to be imaged,
receiver means operable following each pulse transmission for processing first signals produced by said transducer means in response to energy reflected from the focal point to produce reflection image data substantially dependent upon reflectivity of the subject at the focal point, and for processing second signals produced by said transducer means in response to energy reflected from a back-scatter zone opposite the focal point from the transducer means to produce transmission image data substantially dependent upon attenuation of the subject at the focal point, and
means responsive to said reflection and transmission image data for generating combined image data which is a function of both said reflection and transmission image data for use in a C-scan image display.

55. In an ultrasonic imaging system as defined in claim 54 wherein said ultrasonic transducer means comprises a unitary transducer for receiving ultrasonic energy reflected from the focal point and from the back scatter zone.

56. In an ultrasonic imaging system as defined in claim 54 wherein said means for generating combined image data comprises adder means for adding said reflection and transmission image data.

57. In an ultrasonic imaging system as defined in claim 56 wherein said means for generating combined image data includes means for weighting said reflection and transmission image data before adding the same at said adder means.

58. In an ultrasonic imaging system as defined in claim 57 including means for controlling said weighting means for controlling the weighting of at least one of said reflection and transmission image data.

59. In an ultrasonic imaging system as defined in claim 54 including means for filtering at least one of the reflection and transmission data before supplying said data to said means for generating combined image data.

60. In an ultrasonic imaging system as defined in claim 54 including visual display means responsive to combined image data for visual C-scan display of a combined image.

61. In an ultrasonic imaging system as defined in claim 54 wherein the ultrasonic transducer means is focused at the focal point during pulse insonification of the subject.

62. In an ultrasonic imaging system as defined in claim 54 wherein the ultrasonic transducer means is focused at the focal point during reception of ultrasonic energy from within the subject.

63. In an ultrasonic imaging system as defined in claim 54 wherein the ultrasonic transducer is focused at the focal point during both pulse insonification of the subject and reception of ultrasonic energy from within the subject.

* * * * *